March 15, 1966 W. D. VOELKER 3,240,846
METHOD AND APPARATUS FOR PREPARING POLYURETHANE
FOAM SANDWICH STRUCTURE
Filed Aug. 6, 1962
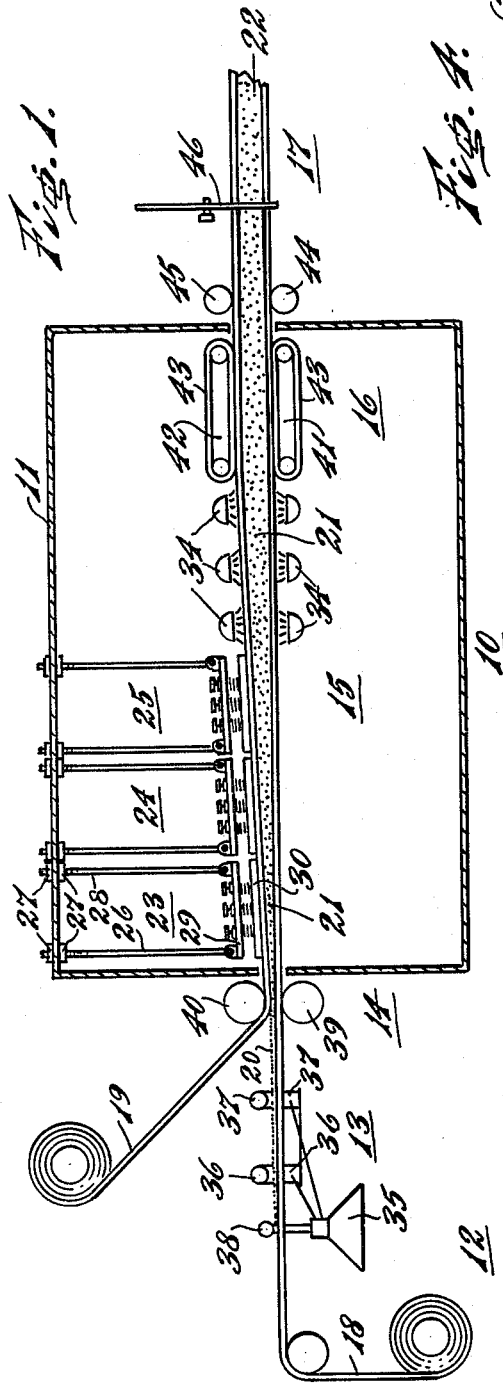
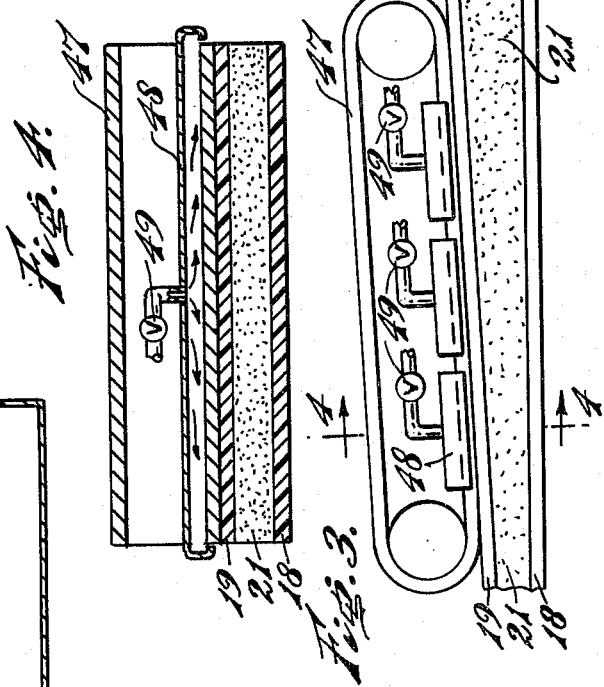
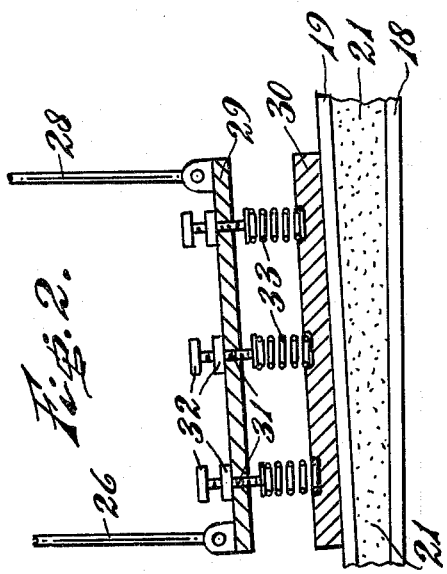
INVENTOR
Walter D. Voelker
BY John R. Ewbank
ATTORNEY

United States Patent Office 3,240,846
Patented Mar. 15, 1966

3,240,846
METHOD AND APPARATUS FOR PREPARING POLYURETHANE FOAM SANDWICH STRUCTURE
Walter D. Voelker, Philadelphia, Pa., assignor, by mesne assignments, to Allied Chemical Corporation, New York, N.Y., a corporation of New York
Filed Aug. 6, 1962, Ser. No. 215,128
3 Claims. (Cl. 264—47)

This invention relates to the manufacture of structures comprising a layer of polyurethane foam secured to a facing sheet, and is particularly concerned with the regulation of the foam-forming chemicals during the period when the foam is initially rising.

Bird Patent 2,841,205 describes a machine in which a polyurethane foam structure is prepared by advancing a sheet through a coating zone, through a creaming zone, through a zone of initial rise, and then underneath an inclined plane, serving as a pressure plate during the further rising of the foam-forming chemicals. The pressure plate is parallel to the bottom sheet after the foam has risen to its intended height, serving to preserve the predetermined thickness during the development of significant tensile strength in the foamed composition undergoing the polymerization, curing, and stabilization steps.

In accordance with the present invention a machine for preparing a structure comprising a layer of polyurethane foam bonded to each of two facing layers is prepared by a method in which a sandwich comprising the facing sheets and an intermediate coating of chemicals approximately 3% of the thickness of the intended foam is advanced through a plurality of adjustable pressure zones, each of such pressure zones being adjusted to provide sufficient pressure to minimize the loss of gas from the initially rising composition but pressure insufficient to bring about a crushing of the fragile structure.

It has been found that the variety of compositions suitable for use in continuous production of polyurethane multi-layer structures is such that no single pressure plate or single pressure zone can adequately adapt to the variations in the performance of the rising composition. Moreover it has been established that in the absence of downward pressure upon the upper sheet of the horizontally advancing sheet, certain formulations evolve carbon dioxide in such a manner as to impair the adhesions of the core to the upper sheet and/or to delaminate the upper sheet from the core. Certain formulations are extremely sensitive to crushing during the initial stages of creaming and/or rising. By the application of the present invention, the machine operator may adapt the pressure applied to the upper surface of the rising structure in accordance with the pressure appropriate for the formulation being employed and the precise time of rise.

The nature of the invention is further clarified by the accompanying drawings in which FIG. 1 is a schematic view of a method for the preparation of multi-layer structures using the plurality of adjustable pressure zones. FIG. 2 is a detailed side view of a zone in which a coated sheet material undergoes a rising under the restraint of one of a plurality of pressure zones, showing an adjustment for adapting the pressure to the particular requirements as the rising properties of the formulation being employed. FIG. 3 is a schematic view of a portion of a rising zone in which an endless belt is pushed against the upper surface of the advancing structure by pneumatic pressure which is adjusted in accordance with the desires of the machine operator. FIG. 4 is a sectional schematic view taken on line 4—4 of FIG. 3.

Referring now in detail to the drawings, there is shown in FIG. 1 a method which can be conducted in a machine 10 comprising a frame 11 and characterized by zones including a facing sheet supply zone 12, coating zone 13, metering zone 14, rising zone 15, stabilizing zone 16, and product withdrawal zone 17. A lower facing sheet 18, and an upper facing sheet 19 are advanced through the several zones, receiving a coating of a mixture of polyurethane foaming chemicals 20, which mixture undergoes a transformation in the rising zone 15 to provide a composition 21 containing gas cells. Although the composition 21 possesses relatively little tensile strength, it is converted by the usual polyurethane foam forming reactions into a polyurethane foam 22 having acceptable tensile strength, crushing strength, and other properties required by the end use of the foam.

Particular attention is directed to the rising zone 15, which, in accordance with the present invention, is provided with a plurality of pressure zones 23, 24 and 25. These pressure zones are adapted to regulate the profile of the cross section of the rising of the multi-layer structure so that the upper sheet 19 is pushed into contact with a sufficient amount of the polyurethane foaming composition 21 to develop a good bond therewith. In the absence of any pressure, it is possible for the gas generated in the foam to concentrate as a gas cell at the bottom surface of the upper sheet and to prevent adhesion of the composition 21 to the upper sheet 19, whereby delaminated products may be produced in the machine. If the pressure is excessive, the gas develops venting routes, and the composition is crushed so that no strong light density foam 22 develops. By the proper application of pressure, the polyurethane foam forming composition 21 expands in such a way that the gas distribution is reasonably uniform throughout, without excess concentration adjacent to the bottom surface of the upper sheet 19, and without delamination. The foam-forming composition 21 undergoes a transformation into a cured polyurethane foam while developing secure adhesion to both the upper facing sheet 19 and a lower surface facing sheet 18. The amount of pressure necessary at various stages of the rise to achieve this desired result is not identically the same with all formulations employed in the polyurethane industry. Some compositions are able to undergo a desirable rising while maintaining a reasonably uniform slope throughout most of the rising but other compositions benefit from adjustment of the profile of rising to provide a more pronounced concave convex curve.

In each of the pressure zones, 23, 24, and 25, the pressure applied to the top sheet 19 is adjustable. The apparatus is substantially the same for each pressure zone. A forward support 26 is adjustably positioned in the frame 11 by adjusting nuts 27. A rear support 28 is also suspended from the frame at an adjustable height through adjusting nuts 27. The supports 26 and 28 position a beam 29 at the desired location above the level of the horizontally moving lower sheet 18. A pressure plate 30 is resiliently secured to the beam 29 by means of adjustable studs 31, adjusting nuts 32, and springs 33. The gross position of the pressure plate 30 is controlled by the adjustment of the suspension supports 26 and 28, but the microadjustment of the position and the pressure by which the plate is yieldingly urged against the upper sheet 19 are controlled by the adjustment of the nuts 32 for the springs 33.

Particular attention is directed to the provision of a plurality of pressure zones, each independently adjustable, whereby the profile of the advancing sandwich structure can be accurately adjusted to achieve the pressure on the upper sheet 19 sufficient to enhance the adhesiveness of the rising composition 21 to the upper sheet 19, but insufficient to impair the attainment of the low density desired in the foam core.

Suitable heating means, such as infra-red lamps 34, may be positioned in appropriate portions of the rising zone 15, and the heat helps to assure reliable uniformity of the thickness of the sandwich structure. Various combinations in the arrangement of the lamps 34 and the pressure zones 23, 24, and 25, are possible for adapting to the peculiarities of the formulation undergoing the foaming reaction. Laboratory tests showing the rate at which the height of the foam increases after mixing of the reactants can be useful in formulating the program of pressure and heat most reliably effective for a particular formulation.

In the coating zone 13, a mixing device 35 can be regulated by detecting devices 36 and 37 adapted to detect a deficiency or excess of freshly applied coating composition 20, whereby dispenser 38, supplied by the mixer 35, consistently coats the amounts of polyurethane-forming chemicals onto the advancing sheet 18 necessary for maintaining a uniform thickness. Metering rolls 39 and 40 in the metering zone 14 serve to prevent the passage into the rising zone 15 of more than the predetermined thickness of coating 20. As is customary with metering rolls, suitable means are provided so that the slit between the metering rolls 39 and 40 may be adjusted, ordinarily by raising or lowering the axis of roller 40.

The stabilizing zone 16 may include a lower pressure member 41 and an upper pressure member 42, adapted to maintain the thickness of the sandwich structure during the heating thereof to cure and stabilize the polyurethane foam core. An endless belt 43 may be employed in each of the pressure members 41 and 42. The portion of the sandwich structure leaving the stabilizing zone 16 between the belts 43 is significantly stronger (both as to crushing strength and as to tensile strength) than the portion of the sandwich structure entering the stabilizing zone. The pulling force for advancing the structure through the several zones is applied by power-driven pinch rolls 44 and 45. A cutting device 46 may cut the continuously produced strip of product into a plurality of panels for removal in the product withdrawal zone 17.

In the alternative embodiment shown in FIGS. 3 and 4, the plurality of separately adjusted pressure zones are regulated by the control of the several supplies of compressed air to the several zones and the pneumatic pressure is directed against a moving endless belt 47. Each pressure zone may include a box-like diffusing nozzle 48 supplied with compressed air through a valved compressed air supply line 49. The operator of the machine may adjust the pressure against the various stages of the rising structure by regulating the air pressure directed to the separate zones. Other adjustments may also be provided to increase the flexibility of the control of the pressure along the path of the advancing structure so that for each composition employed the profile of the rise is adapted to maintain good adhesion between the rising composition 21 and the upper sheet 19 and to prevent the crushing of the foam.

Various modifications of the method and apparatus are possible without departing from the inventive concepts as set forth in the appended claims.

The invention claimed is:

1. A method of producing a multi-layer structure comprising upper and lower facing sheets and a core layer of predominantly closed cell polyurethane foam which method comprises the steps of: (A) coating an advancing facing sheet with a polyurethane foam-forming composition; (B) combining said coated facing sheet with a second facing sheet to provide an advancing and expanding sandwich comprising upper and lower facing sheets and an intermediate layer of rising foam-forming composition; (C) subjecting said advancing and expanding sandwich to positive but yieldable pressure in a plurality of successively independent applications during at least the major portion of the period of rise of the foam-forming composition, such pressure applications being over a plurality of successively adjacent areas of the upper facing sheet and being sufficient to suppress gas from the foam-forming from lodging at the interface of the foam and upper facing sheet but insufficient to cause crushing of the foam; and (D) thereafter curing the fully risen polyurethane foam to provide a multi-layer structure in which the distribution of gas cells throughout the thickness of the polyurethane foam layer is more nearly uniform and in which both upper and lower facing sheets are firmly bonded to the polyurethane foam core by reason of said pressure applications.

2. Apparatus for the production of a multi-layer foam structure comprising a lower facing sheet, a polyurethane foam core, and upper facing sheet, which apparatus comprises: (A) means for advancing upper and lower facing sheets along a generally fixed path; (B) means for depositing a polyurethane foam-forming composition onto at least one of said facing sheets; (C) means for preparing a sandwich comprising said upper and lower facing sheets and intervening coating of foam-forming composition; (D) a plurality of independent and successively adjacent pressure-applying means along said path of advancement in the area of expansion of the foam-forming composition, said means adapted to exert positive but yieldable pressure upon the upper facing sheet and mounted above the lower facing sheet at elevations which increase in the direction of the path of advancement; and means downstream from said pressure-applying means for withdrawing a multi-layer structure comprising said upper and lower facing sheets and a core of cured polyurethane foam.

3. The apparatus of claim 2 in which the pressure applying means are resiliently mounted pressure platens.

References Cited by the Examiner
UNITED STATES PATENTS

| | | | |
|---|---|---|---|
| 2,841,205 | 7/1958 | Bird | 18—59 |
| 2,866,730 | 12/1958 | Potchen et al. | 18—59 |
| 2,872,965 | 2/1959 | Sisson | 18—59 |
| 2,921,346 | 1/1960 | Fischer | 18—4 |
| 3,047,449 | 7/1962 | Coble | 18—59 |

FOREIGN PATENTS 147,000   6/1952   Australia.

ROBERT F. WHITE, *Primary Examiner.*

LESLIE GASTON, ALEXANDER BRODMERKEL,
*Examiners.*